Patented Jan. 18, 1938

2,106,111

UNITED STATES PATENT OFFICE 2,106,111

MANUFACTURE OF ALKALI CELLULOSE

Alfons Bayerl and Karl Kösslinger, Dessau, Germany, assignors to I. G. Farbenindustrie Aktiengesellschaft, Frankfort-on-the-Main, Germany No Drawing. Application February 5, 1935, Serial No. 5,152. In Germany February 9, 1934

6 Claims. (Cl. 260—10)

Our present invention relates to the manufacture of alkali cellulose.

One of its objects is an improved process of manufacturing alkali cellulose. Further objects will be seen from the detailed specification following hereafter.

For the manufacture of alkali cellulose it is usual to start from dry wood-pulp, this being treated with an excess of caustic soda solution and, after mercerization, pressed to remove the excess of caustic soda solution. The further operation consists in finely shredding the pressed alkali cellulose, the product, after a more or less thorough ripening, being treated with carbon disulfide.

It has been proposed to start from moist wood-pulp in the condition in which it is found in the course of the manufacture and to treat this with a caustic soda solution of correspondingly higher concentration in a beater. For example, 100 kilos of moist wood-pulp (containing 50 per cent. of water) may be treated with 50 litres of caustic soda solution of 40° Bé (—35 per cent. of NaOH) in a beater and the alkali cellulose produced by the kneading and grinding may be directly xanthated and dissolved to form viscose. However, when using kneading machines of a kind resembling the shredder or sulfidizing drum usual in the artificial silk industry, it has not been possible to realize such a simple process. On the contrary, it is necessary to work with an excess of caustic soda solution and to separate the excess in known manner before the xanthation.

Viscose has been made without isolating the alkali cellulose as an intermediate product. The pulp has been introduced into the quantity of caustic soda solution of suitable concentration necessary for making viscose and, after a uniform, fibrous magma has been obtained, the latter is sulfidized by addition of the carbon disulfide. In this process it is necessary that the mixture of cellulose and caustic soda solution should contain at most 25 per cent. of cellulose. If the concentration of the fiber is greater than this the process cannot be successfully carried through.

This invention relates to a process of making alkali cellulose with the aid of a kneading machine, sulfidizing churn or shredder, from a mixture of caustic soda lye and cellulose pulp, which contains more than 25 per cent. of cellulose, the product being applicable directly without pressing and without particularly thorough and prolonged grinding of the cellulose for the production of xanthate and viscose.

In order to make an alkali cellulose well suitable for the production of artificial silk without the use of an excess of lye in a kneading machine, sulfidizing churn or shredder and with the expenditure of a time normal for making alkali cellulose, it is necessary to observe certain conditions.

The moist cellulose pulp obtained as the final product of the manufacturing and purifying processes, that is to say the pulp which has been mechanically freed from water and before it is further worked up to dry pulp in the artificial silk factory, is advantageously used as the parent material for the process of this invention. It contains an average of 40 to 60 per cent. and preferably 50 to 60 per cent. of water; the concentration of the caustic soda solution used for making the alkali cellulose must be graded in accordance with the water content of the cellulose pulp. In no case may the caustic soda solution used be diluted with water present in the pulp to such an extent that the concentration of the solution falls below that necessary for the mercerization, that is to say below 17 to 20 per cent. of NaOH for a range of temperature between 15 and 20° C., account being taken of the water produced by reaction. The concentration of the caustic soda solution which is to be added to the moist pulp must in most cases amount to 40 to 50 per cent. Care is used in distributing this concentrated caustic soda solution. Distribution by means of the ordinary nozzles or sprayers does not suffice; the caustic soda solution must be distributed in the form of a cloud as fine as possible. This is best achieved by means of nozzles which spray the caustic soda solution by means of gas under pressure. Very suitable are, for example, the so-called "Schlickdüsen". Only by producing the finest subdivision in the spray it is possible to produce penetration throughout the generally voluminous, flocculent cellulose mass. It is further advantageous that the temperature in the mass should be kept at or at least approximately at the temperature characteristical for the special concentration of the caustic soda solution. During the shredding and spraying with caustic soda solution the mass must be strongly cooled, so that the temperature necessary for the mercerizing effect shall not be exceeded. After the distribution of the caustic soda solution the kneading machine or the shredder or the sulfidizing churn is kept in operation for some time, for example an hour until a uniformly mercerized product is obtained. The proportion of cellulose in the mixture of pulp and caustic soda solution should in all cases be above 25 per cent.

The process not only leads to a fundamental simplification of working and a saving of time and power but also saves chemicals; for example, the considerable quantities of contaminated caustic soda solution, which cannot be avoided in making alkali cellulose by the dipping process, are not produced. In the manufacture of alkali cellulose by this invention less caustic soda solution is necessary than the quantity which has been left in the press-cakes after these have been freed from the excess of caustic soda solution in the former processes. Thus, when working according to the dipping method and removing the excess of caustic soda solution by pressing the alkali cellulose contains NaOH and cellulose in the ratio of 1:2 whereas according to this invention it is possible to use only so much caustic soda solution that it contains NaOH and cellulose in the ratio 1:3, owing to that portion of the solution which has not been consumed in the mercerization but only adheres to the fibers. In spite of this, however, a thorough sulfidizing of the alkali cellulose, poor in alkali, can be realized. The operation yields a clear, soluble product free from fibers and of unobjectionable characteristics. Moreover, the losses of cellulose, always considerable in the immersion operation, are avoided, so that an essentially higher yield of silk is obtained. Cellulose pulp produced with the aid of nitric acid is particularly suitable for use in the invention because of its high reactivity.

The following examples serve to illustrate the invention.

*Example 1.*—222 kilos of purified moist cellulose pulp containing 100 kilos of dry pulp made by the process of digesting by means of nitric acid, are shredded for 1 hour in a kneading apparatus of the Werner & Pfleiderer type and are then sprayed by means of a "Schlickdüse" with 100 kilos of caustic soda solution containing 50 kilos of pure NaOH while cooling. The temperature is preferably kept at about 10° C. After the caustic soda solution has been added the kneading is continued for 1 hour. The alkali cellulose thus obtained may be sulfidized, either immediately or after a desired ripening. For the sulfidizing operation there may be added 32 kilos of carbon disulfide and the xanthate is then dissolved in a dilute caustic soda solution to a viscose of the required concentration. The viscose is free from fibers and clear. Instead of a ripening for 7 days, the rapid ripening process described in U. S. application Ser. No. 719,696, filed April 10, 1934, may be applied.

*Example 2.*—220 kilos of moist cellulose containing 100 kilos of dry cellulose are sprayed in a shredder with 75 kilos of a caustic soda solution of 48 per cent strength (36 kilos of NaOH) in finely subdivided condition. After a short mixing 32 kilos of a solution of sodium sulfide of 25 per cent. strength (8 kilos of Na₂S) are introduced likewise in a finely subdivided condition while shredding, and the whole is still mixed for some time. Without ripening the alkali cellulose is sulfidized with 34 kilos of carbon disulfide and the formed xanthate is dissolved in 900 liters of a caustic soda solution of 4 per cent. strength. The viscose obtained possesses the viscosity of about 25 seconds measured in the ball viscosimeter this viscosity being normal for viscose solutions to be spun into artificial threads.

What we claim is:

1. A process of manufacturing alkali cellulose which comprises spraying a cloud of caustic soda solution containing about 40 to about 50 per cent. of NaOH on wet wood pulp containing from about 40 to approximately 60 per cent. of dry pulp, the ratio of dry pulp to the caustic soda solution applied being less than 1:3.

2. A process of manufacturing alkali cellulose which comprises spraying a cloud of caustic soda solution containing about 40 to about 50 per cent. of NaOH on wet wood pulp containing from about 40 to approximately 60 per cent. of dry pulp, the ratio of dry pulp to the caustic soda solution applied being less than 1:3, and using the resulting alkali cellulose for the sulfidizing process without the step of pressing same.

3. A process of manufacturing alkali cellulose which comprises spraying a cloud of caustic soda solution containing about 40 to about 50 per cent. of NaOH on wet wood pulp containing from about 40 to approximately 60 per cent. of dry pulp and then spraying a cloud of sodium sulfide on the mixture, the ratio of dry pulp to the caustic soda solution applied being less than 1:3.

4. A process of manufacturing alkali cellulose which comprises spraying a cloud of caustic soda solution containing about 40 to about 50 per cent. of NaOH on wet wood pulp containing from about 40 to approximately 60 per cent. of dry pulp and then spraying a cloud of sodium sulfide on the mixture, the ratio of the dry pulp to the caustic soda solution being less than 1:3, and using the resulting alkali cellulose for the sulfidizing process without the step of pressing same.

5. A process of manufacturing alkali cellulose which comprises spraying a cloud of 100 kilos of caustic soda solution containing 50 kilos of NaOH on 222 kilos of moist wood pulp containing 100 kilos of dry pulp and using the resulting alkali cellulose for the sulfidizing process without the step of pressing same.

6. A process of manufacturing alkali cellulose which comprises spraying a cloud of 75 kilos of caustic soda solution of 48 per cent. strength on 220 kilos of wet wood pulp containing 100 kilos of dry pulp and then spraying a cloud of 32 kilos of sodium sulfide solution of 25 per cent. strength on the mixture, the resulting alkali cellulose being used for the sulfidizing process without the step of pressing same.

ALFONS BAYERL.
KARL KÖSSLINGER.